S. DEMBOWSKI.
RECEPTACLE.
APPLICATION FILED MAR. 25, 1920.
1,367,242.
Patented Feb. 1, 1921.
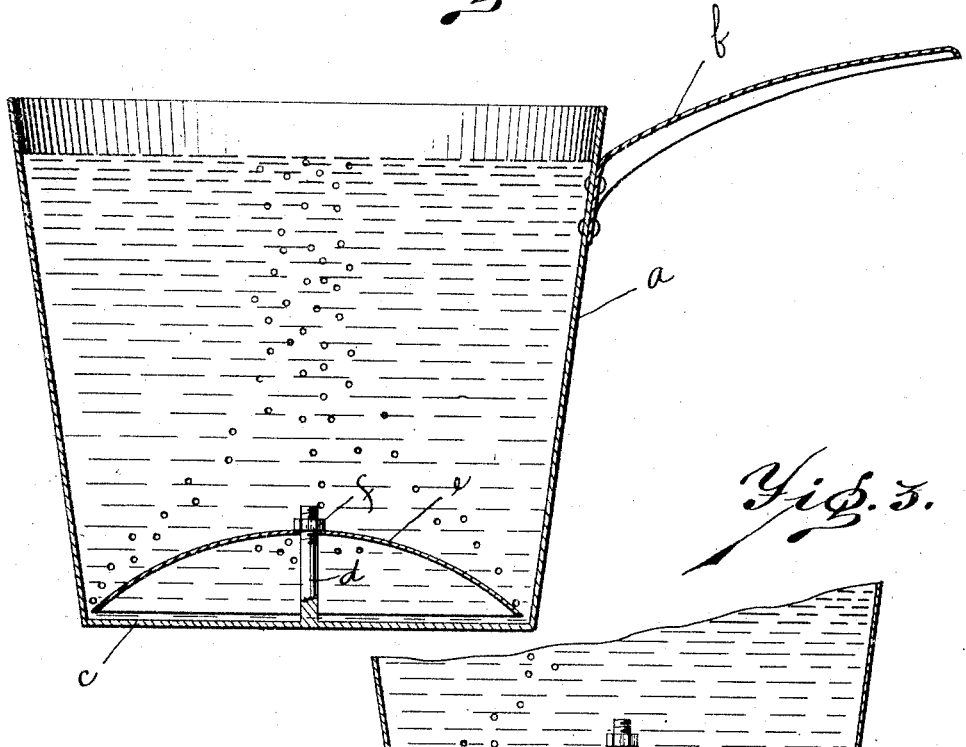
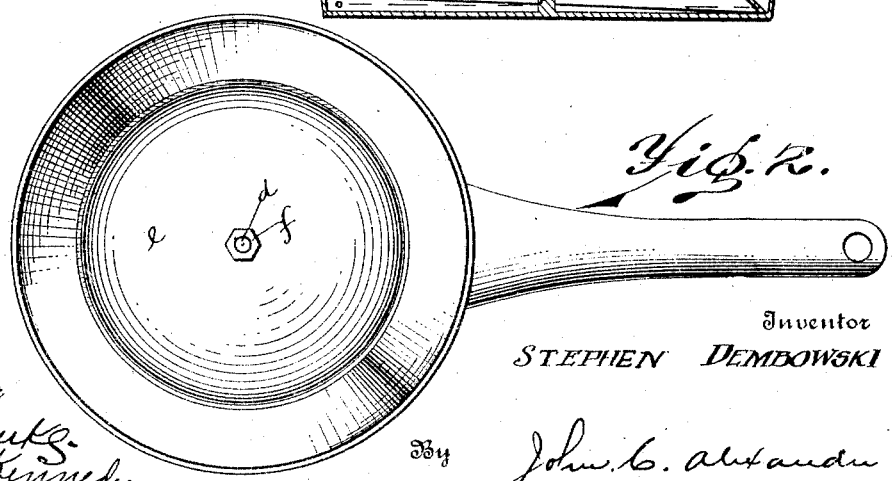
Inventor
STEPHEN DEMBOWSKI

UNITED STATES PATENT OFFICE.

STEPHEN DEMBOWSKI, OF HAMTRAMCK, MICHIGAN, ASSIGNOR OF ONE-THIRD TO STANLEY RUTKOWSKI AND ONE-THIRD TO JOSEPH BARNIKOWSKI, BOTH OF HAMTRAMCK, MICHIGAN.

RECEPTACLE.

1,367,242.   Specification of Letters Patent.   Patented Feb. 1, 1921.

Application filed March 25, 1920. Serial No. 368,523.

*To all whom it may concern:*

Be it known that I, STEPHEN DEMBOWSKI, a citizen of the Republic of Poland, residing at Hamtramck, in the county of Wayne and State of Michigan, have invented certain new and useful Improvements in Receptacles in Which Fluids May be Boiled, of which the following is a specification.

My invention relates to an improvement in receptacles in which fluids may be boiled and particularly to means adapted for use in a pot or other cooking utensil to prevent the fluid carried therein from boiling over. It is a simple device of easy adaptation to a conventional boiling pot or other utensil and inexpensive to manufacture.

In the drawings:

Figure 1 is a vertical section through a cooking utensil showing my improved device in place.

Fig. 2 is a plan view.

Fig. 3 is a fragmentary cross section showing the tilting action of the disk.

Let $a$ represent a receptacle or pot for containing fluid provided with a handle $b$. The bottom of the pot or receptacle is indicated as $c$. A stud, shown in the drawing as a threaded stud adapted to receive a nut is indicated as $d$. This stud is here shown as integral with the bottom $c$. It is apparent that it might be attached in a number of ways. It might be a bolt passing through the bottom of the pot if the jointure was made water tight. This is merely shown as a preferred form of construction.

A circular member $e$ concaved on its lower side is provided with a central passageway therethrough of slightly larger diameter than the diameter of the stud $d$, and adapted to be received over said stud and held thereon by means of a nut $f$. This member $e$ is adapted to rest on the bottom of the receptacle and the passageway through which the stud passes is of such size as to permit of the tilting movement of the disk as shown in Fig. 3. It will further be observed that the diameter of member $e$ is such that it does not completely cover the bottom of the receptacle so it will not bind against the sides of the pot $a$.

In the operation of the device, when the fluid carried in the receptacle is raised to the boiling point, steam will gather underneath the false bottom or member $e$. This gathering steam underneath member $e$ will force the water level downwardly under member $e$. As the water recedes underneath member $e$ and the gas bubbles concentrate in the upper portion of the space thereunder there will be produced a wabbling of the member $e$ and eventually when the water has receded sufficiently and sufficient gas bubbles have gathered the member $e$ will tilt as shown in Fig. 3 and the gas bubbles will escape therefrom underneath the side and the water will again rise and occupy the space vacated by the gas, and the process will be repeated again. In Fig. 1 the boiling operation has just begun, the pan member $e$ is slightly elevated from the bottom of the pot. In Fig. 3, the water has receded underneath member $e$ by reason of the collection of the gas bubbles to such an extent as to cause such member to tilt, as shown, allowing the escape of the gas, as shown, at one side thereof.

This vessel can be easily cleaned. The member $e$ occupies but a small amount of space. It will add but little to the cost of the finished article, and it will prevent the boiling over of the fluid. even though the vessel is left unattended.

Having thus described my invention what I claim is:

1. In a device of a class described, a cooking utensil for containing fluid, an upwardly projecting stud carried axially of the bottom of such utensil, a disk, concaved on the lower side, sleeved over such stud in such a manner that the same may be tilted thereon and so as to normally rest on the bottom of the utensil, and means for holding the disk on such stud.

2. In a device of the class described, a receptacle for containing fluid, an upwardly projecting stud carried centrally of the bottom of said receptacle, a disk concaved on its lower side loosely sleeved over said stud, means for retaining such disk in place on said stud yet so loosely as to permit of a slight uplifting of the disk from the bottom of the receptacle and to permit of a tilting movement of the disk.

3. In a device of the class described the combination of a receptacle, a device concaved on its lower side, said device normally resting on the bottom of the receptacle, and means for limiting the upward movement of said device but permitting it to tilt.

STEPHEN DEMBOWSKI.

Witnesses:
MARY KENNEDY,
JOHN C. ALEXANDER.